Patented June 15, 1943

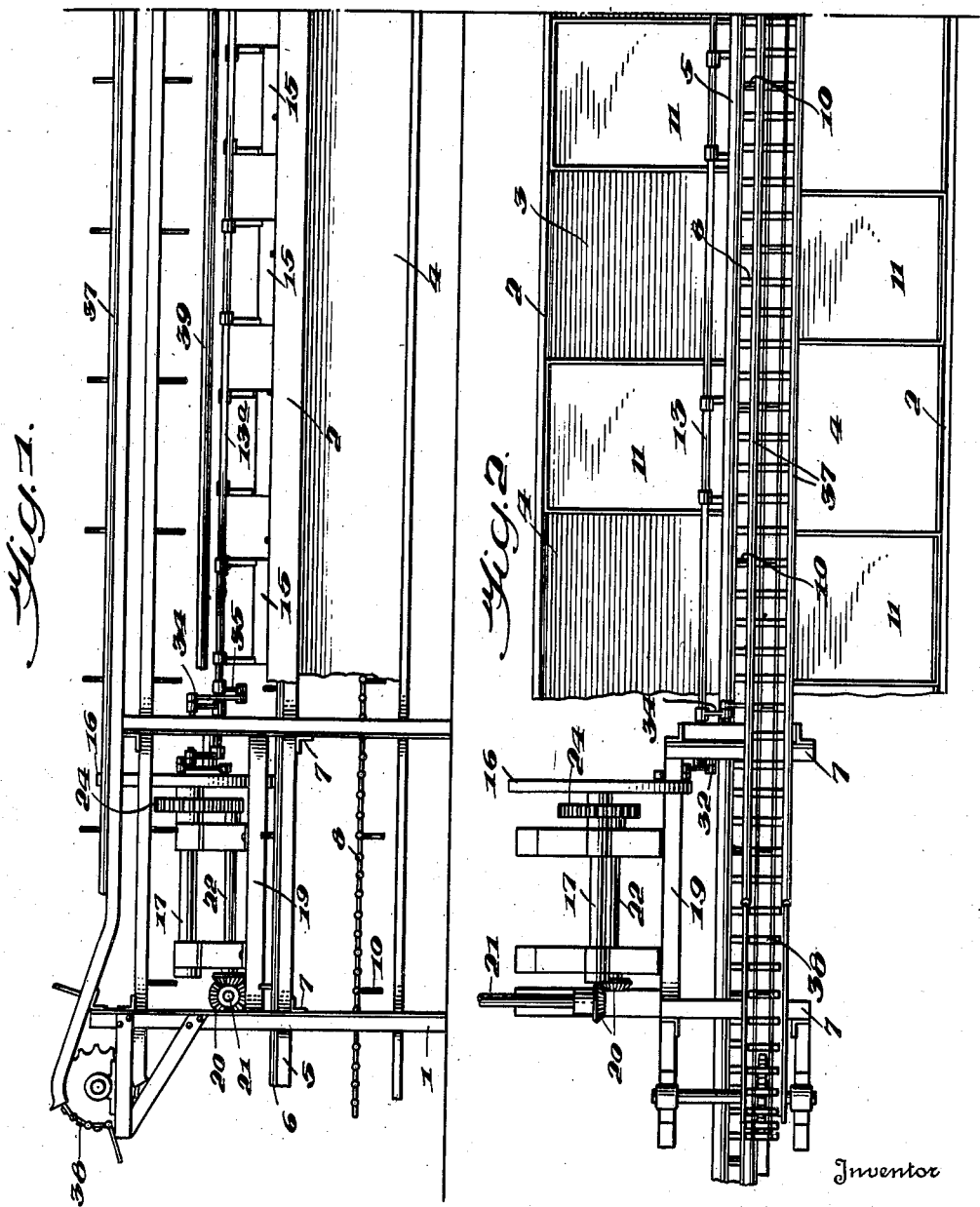

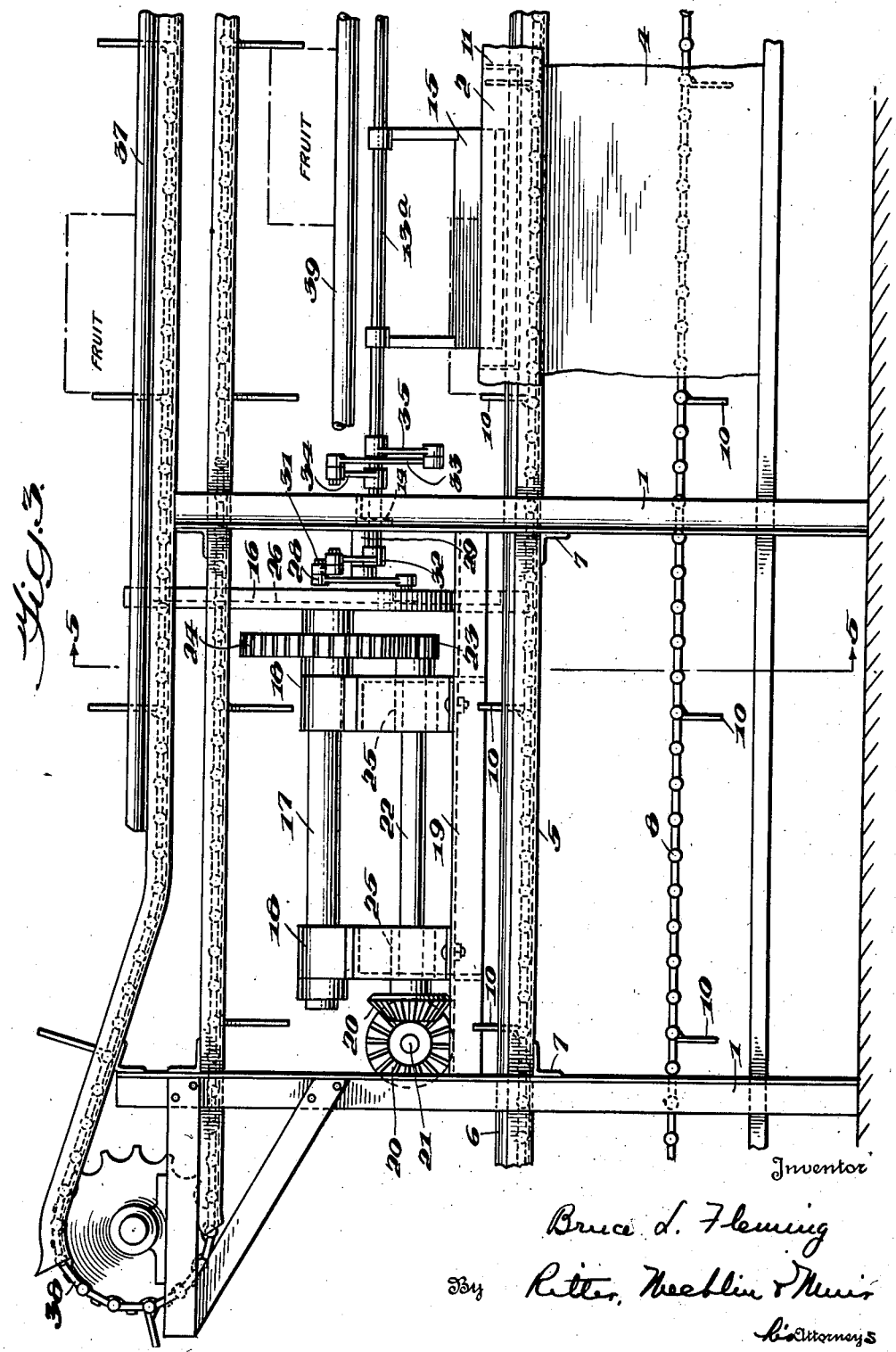

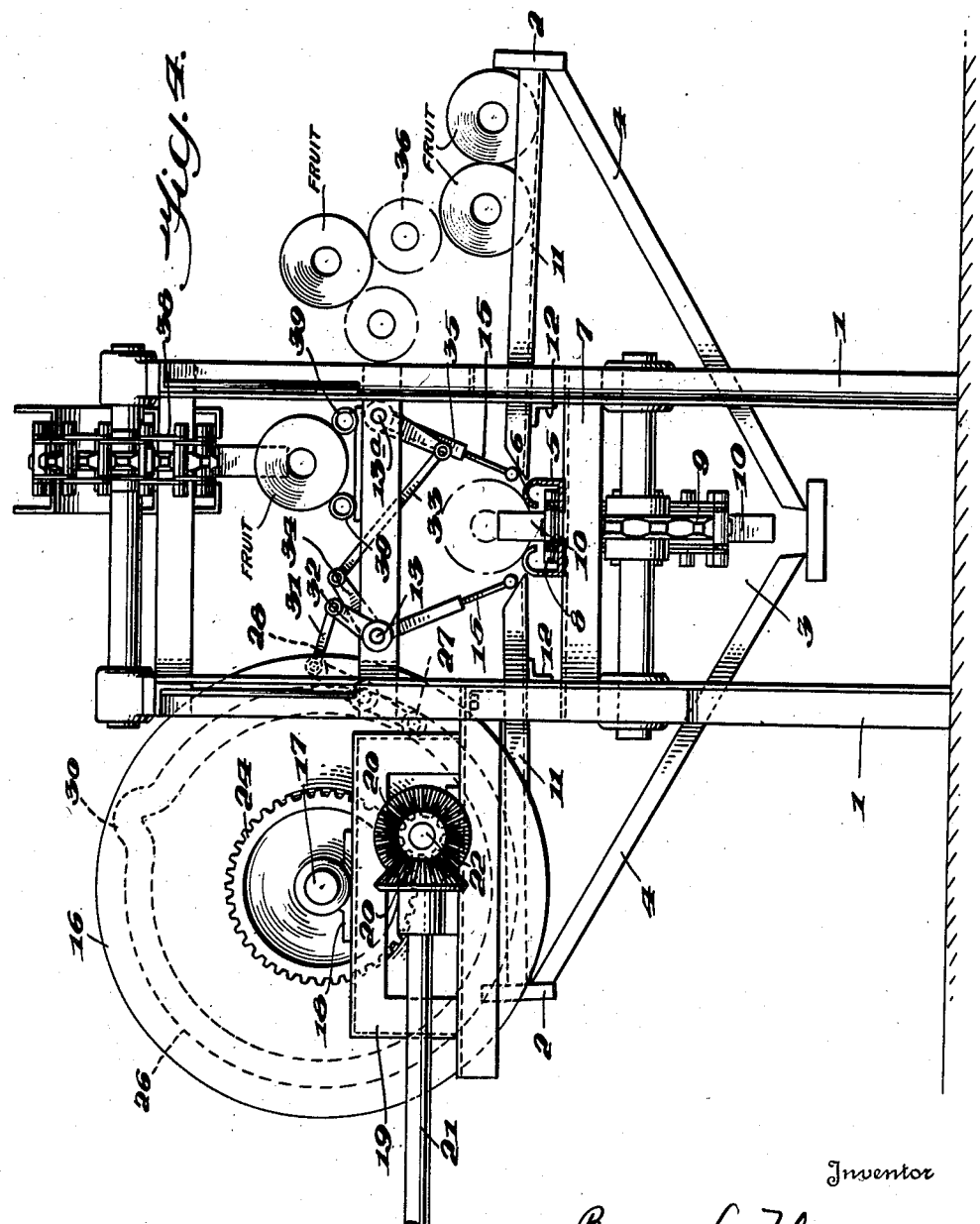

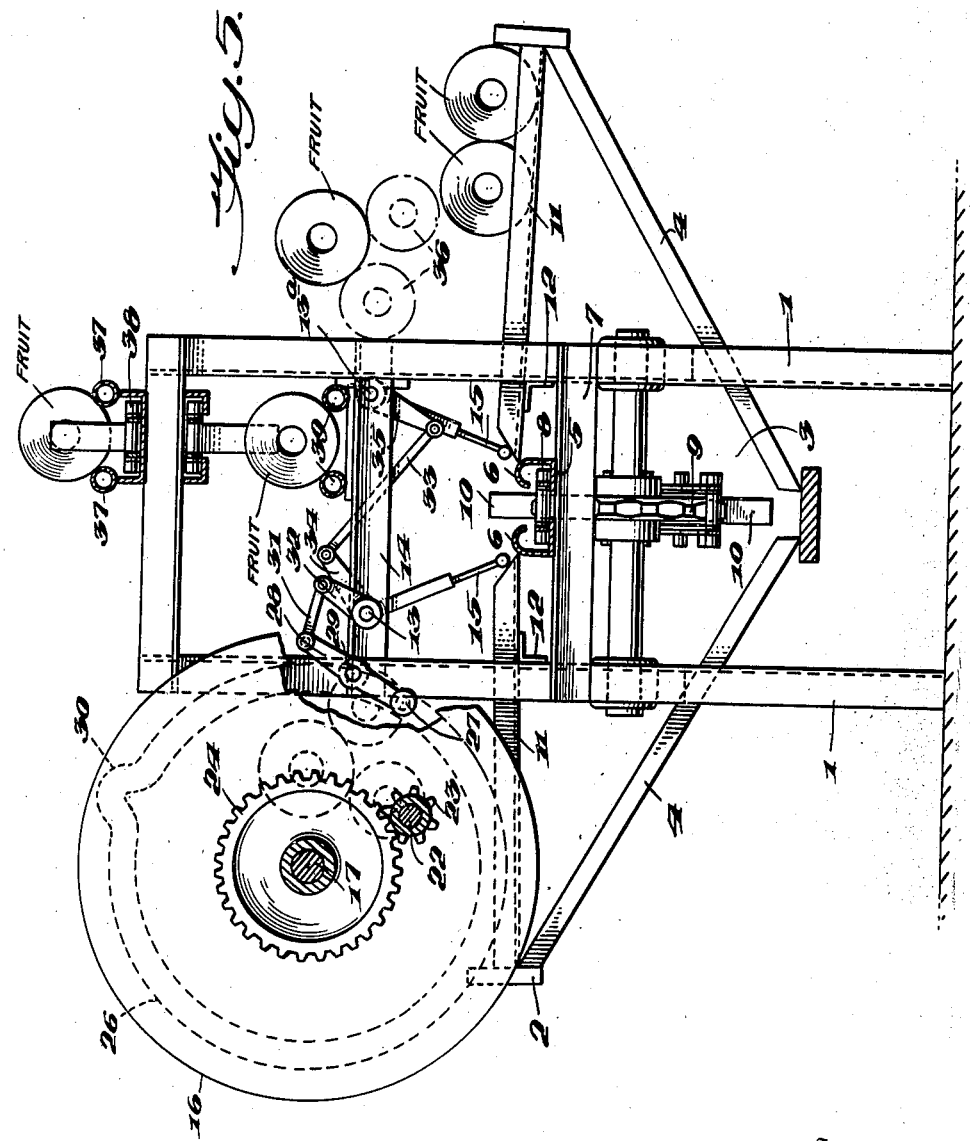

2,322,190

UNITED STATES PATENT OFFICE 2,322,190

FRUIT INSPECTING AND TRIMMING TABLE

Bruce L. Fleming, Lahaina, Territory of Hawaii, assignor to Baldwin Packers, Limited, a corporation of Hawaii Application September 22, 1941, Serial No. 411,911

3 Claims. (Cl. 198—66)

My invention relates to fruit inspecting and trimming tables and particularly to such tables wherein a plurality of inspection stations are arranged along an endless conveyer.

The principal object of the invention is to provide a fruit inspecting and trimming table of the type described with means whereby fruit is delivered from the conveyer to each inspection station at a uniform rate so that each worker at the respective inspection stations will have an equal amount of fruit to inspect and trim.

Inspecting and trimming tables embodying the present invention will be found to be particularly useful in the pineapple canning industry where the fruit, after it leaves the conventional Ginaca machine in the form of a hollow cylinder, is customarily delivered to an endless conveyer or belt so that it may be inspected and trimmed by workers or "trimmers" positioned on opposite sides of the belt. Each trimmer picks the fruit off the conveyer as it is being advanced and, after cutting off pieces of skin or other imperfections with a sharp knife, places the fruit back on the same conveyer or on some other adjacent conveyer so that it will be advanced to other stations where the pineapple is further processed.

This practice customarily followed in the pineapple industry consumes an unreasonable amount of time and is wasteful of labor because (1) the trimmer has to reach far forward to remove the fruit from the conveyer and the same motion is repeated to replace the fruit on the conveyer after having been inspected and trimmed; (2) there is no control over the number of fruit units each trimmer handles and some trimmers, therefore, get away with doing considerably less work than others; and (3) the trimmer near the lower end of the table frequently has to wait a considerable time for a fruit to reach him if, as not infrequently happens, a number of trimmers further up the table take fruit from the conveyer at the same time. In an endeavor to equally proportion the fruit advanced by the conveyer among all of the trimmers, it has become the general practice to have an extra worker at the head of the table to stand on end one fruit out of each number of fruits corresponding to the number of trimmers and require each trimmer to take one fruit from each group of fruit defined by the up-ended fruits.

By the present invention all unnecessary labor is eliminated and the inspection and trimming of the fruit is greatly facilitated.

One of the primary features of the invention consists in providing the table with mechanism operable in timed relation with the movement of the conveyer for automatically moving the fruit laterally from the conveyer toward the respective inspection stations each time the conveyer advances an amount sufficient to present fruit opposite each inspection station.

Another feature of the invention consists in providing the fruit inspecting table with a plurality of pivotally mounted members respectively arranged adjacent the various inspection stations and in providing mechanism for simultaneously actuating said members to cause them to push the fruit from the conveyer toward the inspection stations whenever the conveyer advances an amount sufficient to present fruit opposite each inspection station.

Other and more specific features of the invention, residing in advantageous forms, combinations and relations of parts, will hereinafter appear and be pointed out in the claims.

In the drawings,

Figure 1 is a side elevational view of a part of a fruit inspecting and trimming table embodying my invention.

Figure 2 is a plan view of the construction illustrated in Figure 1.

Figure 3 is an enlarged side elevational view of the head end of the table.

Figure 4 is an end view of the head end of the table.

Figure 5 is a transverse sectional view taken on line 5—5 of Figure 3.

Although the particular machine illustrated in the drawings is primarily designed for inspecting and trimming pineapple, it, of course, will be appreciated that the invention may be used with equal facility with tables for trimming and inspecting other fruit.

Referring more particularly to the drawings, the inspecting and trimming table illustrated is provided with a plurality of upright frame members 1 and longitudinally extending side frame members 2 which are suitably supported adjacent each end of the table. Converging downwardly from the side members and suitably connected at their lower edges to form a trough 3 are inclined side walls 4.

Extending longitudinally of the table substantially midway between the upright legs 1 is a channel-shaped member 5 having inwardly extending curved portions 6 affording a pair of rails onto which the cored cylinders of pineapple are delivered from the Ginaca machine (not shown). The channel member 5 may be conveniently supported by angles 7 which assist in bracing and rigidly connecting the upright members 1. Movable within the channel 5 is the upper reach of an endless link-type conveyer 8 which passes around conventional sprockets customarily employed with this type of endless conveyer, one of which is indicated by reference numeral 9.

Spaced along the conveyer, preferably about twelve inches apart, are a plurality of dogs or pusher arms 10 which are adapted to project upwardly sufficiently far between the rails 6 so as to engage fruit deposited on the rails and propel it therealong. The particular sprocket which drives the conveyer is preferably driven by and in timed relation with the Ginaca machine so that a pineapple cylinder will be deposited on the rails 6 between each succeeding pair of dogs 10. Thus, if the dogs are spaced twelve inches apart, the conveyer is caused to travel 12 inches each time a cylinder of pineapple is discharged from the Ginaca machine onto the rails 6.

Arranged along the table on opposite sides of the conveyer in staggered relation are a plurality of stations where the workers are placed to inspect and trim the fruit advanced by the conveyer. At each station is a pan or the like 11 for receiving the fruit from the conveyer. The outer ends of the fruit receiving pans may be conveniently supported by the side members 2, while their inner ends may be advantageously supported by longitudinally extending angles 12 secured to the upright frame members 1. To facilitate the inspection of the fruit and to insure that the work will be prorated among the several workers, mechanism is provided whereby, when the conveyer has advanced a sufficient amount to present a pineapple opposite each inspection station, the fruit is automatically moved laterally from the conveyer to the pans 11. This mechanism includes a pair of rotatable shafts 13 and 13a which are suitably supported by angle members secured to the upright frame members 1, one of the angle members being indicated at 14. Depending from and rigid with the shafts are a plurality of members 15 for pushing the fruit from the conveyer onto the fruit receiving pans 11. The depending members on one shaft are staggered with respect to those on the other shaft and the shafts are movable in opposite directions so that alternate units of fruit on the conveyer are moved in opposite directions onto the fruit receiving pans.

So that the fruit pushing members 15 will only operate when the conveyer has advanced an amount sufficient to present a fruit opposite each inspection station, and to do so then automatically, the shafts 13 and 13a are actuated by mechanism which is also operated in timed relation with the Ginaca machine. This mechanism includes a rotatable plate-like disk 16 which is carried by a shaft 17 suitably journalled in bearings 18 mounted on a support 19 which is rigidly connected to a pair of the upright members 1 and projects laterally therefrom. The disk 16 is rotated in timed relation to the Ginaca machine through a pair of bevel gears 20, one of which is mounted on a shaft 21 connected to the Ginaca machine and the other of which is mounted on a shaft 22 having a gear 23 meshing with a gear 24 on shaft 17. Shaft 22 may be conveniently journalled in bearings 25 mounted on the support 19.

One face of the disk 16 is provided with a groove 26 into which a roller 27 projects, the roller being revolubly mounted on one end of a lever 28 pivotally mounted intermediate its ends on a pin or the like 29 rigidly secured to the adjacent upright member 1 of the table. The groove 26 is, in the main, concentric with the axis of rotation of the disk but it is provided with an offset or cam portion 30 so that once during each revolution of the disk, lever 28 on which the roller disposed within the groove is mounted will be caused to rotate first in one direction and then in the other. Lever 28 is suitably connected to the shafts 13 and 13a on which the fruit pushing members 15 are mounted so that, when it is operated, suitable movement is imparted to each shaft to cause their members 15 to operate in the manner desired. Thus lever 28 is connected by a link 31 to an arm 32 rigid with and extending upwardly from shaft 13 and shaft 13a is movably connected to shaft 13 by a link 33, the link being pivotally connected to an arm 34 rigid with and projecting upwardly from shaft 13 and being pivotally connected to an arm 35 which is rigid with and extends downwardly from shaft 13a. By connecting the shafts in this manner, it will be perceived that, when lever 28 is operated by disk 16, the shafts and their depending members 15 are caused to simultaneously move in opposite directions.

The ratio between the gears 23 and 24 is such that disk 16 will complete one revolution each time the conveyer has advanced far enough to present a fruit opposite each of the inspection stations on the table and the offset portion 30 of the groove 26 in disk 16 is arranged so as to operate lever 28 and, therefore shafts 13 and 13a at the instant the conveyer travels that amount. Thus it will be perceived that simple and reliable means are provided for automatically moving the fruit from the conveyer to the respective inspection stations each time the conveyer advances an amount sufficient to present fruit opposite each station.

The trimmers are preferably stationed immediately at the right of each fruit receiving pan and a pair of revoluble rollers 36, diagrammatically illustrated in dotted lines, may be mounted on the table in front of each trimmer on which the pineapple may be revolubly supported for ready inspection and trimming. After being inspected and trimmed, the pineapple may be placed on a pair of rails 37 and conveyed therealong by the upper reach of an endless conveyer 38 to a slicing machine (not shown), movement of the conveyer preferably being in timed relation with the slicer. Or, if desired, instead of being placed on rails 37, the inspected and trimmed fruit may be placed upon a pair of rails 39 and be advanced by the lower reach of the conveyer 38 to a cross conveyer (not shown) leading to the "chunk" machine (not shown).

As is customary, the tirimmings or cuttings from the fruit drop down into the trough 3 and they are propelled to one end thereof by the lower reach of the conveyer 8 where they may discharge onto another cross conveyer (not shown).

It will be evident to those skilled in the art that various changes and alterations may be made in structural details of the particular machine illustrated and described without departing from the spirit and scope of the invention as defined in the appended claims.

What I claim is:

1. The improvement in fruit inspecting and trimming tables of the type having an endless conveyer for advancing the fruit and a plurality of inspection stations arranged along the conveyer, said improvement including a rotatable shaft mounted above the conveyer, a plurality of means rigid with said shaft and respectively depending therefrom adjacent said inspection stations, and mechanism operating in timed relation with the movement of the conveyer for rotating said shaft to cause said members to push the fruit from the conveyer toward said inspection stations, said mechanism including periodically movable means for automatically rotating said shaft each time the conveyer advances an amount sufficient to present fruit opposite each inspection station.

2. The improvement in fruit inspecting and trimming tables of the type having an endless conveyer for advancing the fruit and a plurality of inspection stations arranged along opposite sides of the conveyer in staggered relation, said improvement including members for moving alternate units of fruit on the conveyer laterally therefrom in opposite directions toward said inspection stations, and mechanism operating in timed relation with the movement of the conveyer, said mechanism including periodically movable means for automatically actuating said members each time the conveyer advances an amount sufficient to present fruit opposite each inspection station.

3. The improvement in fruit inspecting and trimming tables of the type having an endless conveyer for advancing the fruit and a plurality of inspection stations arranged along opposite sides of the conveyer in staggered relation, said improvement including two sets of movable members, one of said sets of members being adapted to move fruit from the conveyer toward the inspection stations on one side thereof and the other of said sets of members being adapted to move fruit from the conveyer to the inspection stations on the opposite side thereof, and mechanism operable in timed relation with the movement of the conveyer for respectively moving said sets of members in opposite directions, said mechanism including periodically movable means for automatically moving said members each time the conveyer advances an amount sufficient to present fruit opposite each inspection station.

BRUCE L. FLEMING.